Figure 1:
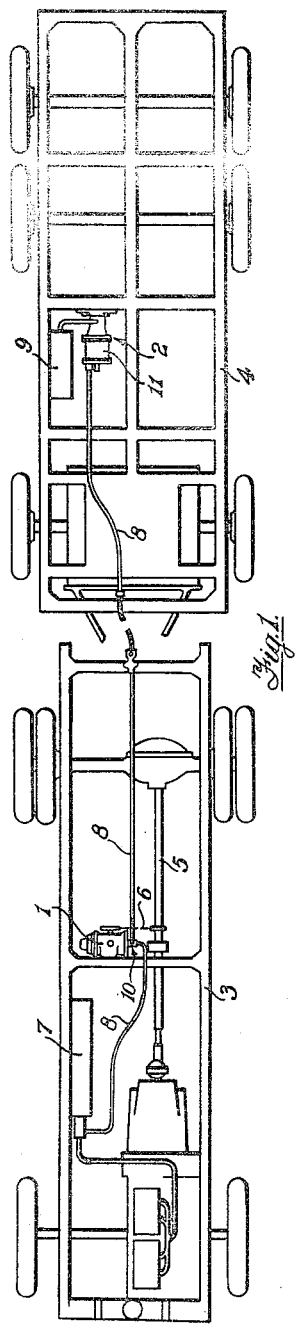

Nov. 29, 1955  S. H. EDGE ET AL  2,725,119
MEANS FOR LUBRICATING VEHICLE CHASSIS
Filed June 1, 1953  2 Sheets—Sheet 1

Inventors
Stanley Howard Edge
Dennis Albert Davis
By
Attorneys

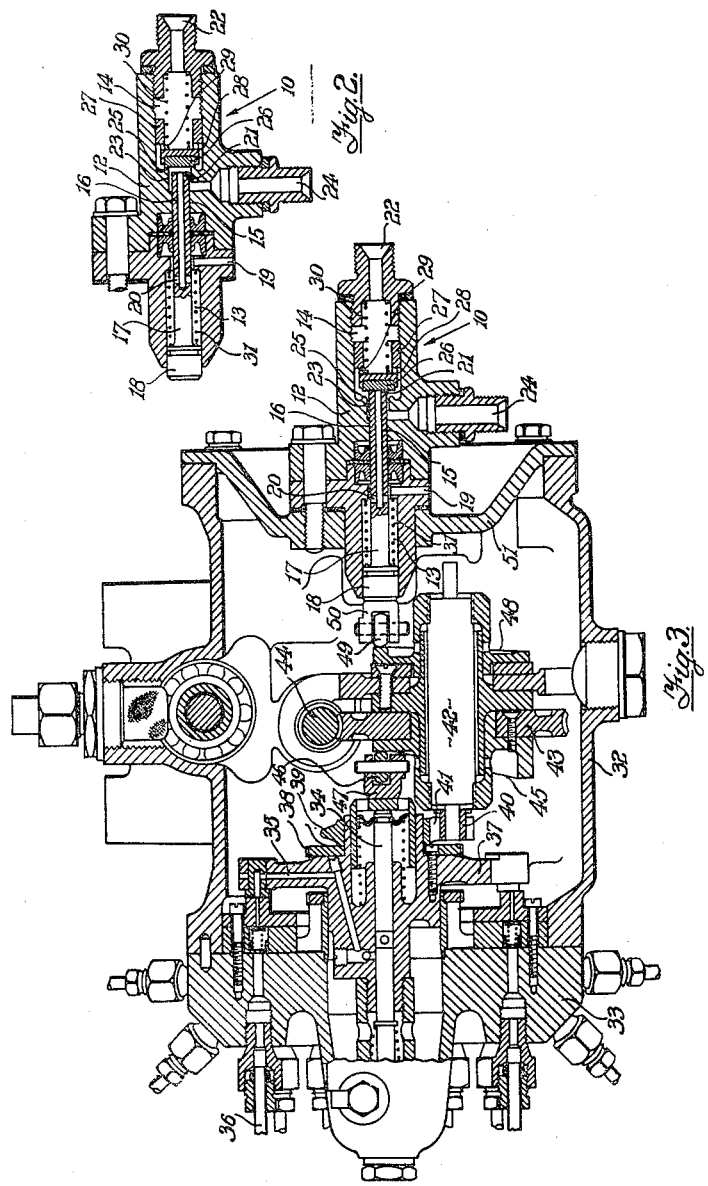

United States Patent Office 2,725,119
Patented Nov. 29, 1955

2,725,119

MEANS FOR LUBRICATING VEHICLE CHASSIS

Stanley Howard Edge and Dennis Albert Sams, Lincoln, England, assignors to Clayton Dewandre Company Limited, Lincoln, England, a British company Application June 1, 1953, Serial No. 358,782

Claims priority, application Great Britain June 20, 1952

8 Claims. (Cl. 184—7)

This invention relates to lubricating systems for the chassis of articulated vehicles, and more particularly to such systems of the kind which employ a mechanically operated lubricating pump for the chassis of the tractor vehicle and a fluid-pressure or vacuum operated lubricating pump for the chassis of the trailer vehicle, the tractor pump being actuated automatically and periodically and being arranged to deliver, at each actuation, a quantity of lubricant to one or more points on the tractor chassis, and the trailer pump being arranged to deliver, at each actuation, a quantity of lubricant to one or more points on the trailer chassis.

The object of the present invention is to provide improved means for controlling the operation of the trailer lubricating pump.

According to the invention means for controlling the operation of the trailer lubricating pump in a lubricating system of the kind referred to comprise a valve device operable by the tractor lubricating pump for controlling the application of fluid-pressure or vacuum to the trailer lubricating pump so as to effect automatic and periodic actuation thereof.

Reference will now be made to the accompanying drawings which illustrate a preferred embodiment of the invention, and in which:

Fig. 1 is a plan view of the chassis of an articulated vehicle fitted with a lubricating system to which the present invention is applied, Fig. 2 is a sectional elevation of the preferred embodiment of the valve means according to the invention, and Fig. 3 is a sectional elevation showing the valve means fitted to the tractor lubricating pump for operation thereby.

Referring first to Fig. 1 of the drawings, a lubricating system of the kind referred to for tractor-trailer vehicles includes a mechanically operated pump 1 and a fluid-pressure or vacuum operated pump 2 mounted on the chassis 3 and 4 of the tractor and trailer vehicles respectively, and each arranged to deliver measured quantities of lubricant periodically to a plurality of points on its respective chassis. The drive for the tractor pump can conveniently be taken from the transmission shaft 5 of the tractor vehicle by means of a belt and pulleys 6, and the power for operating the trailer pump is provided by a source of fluid-pressure or vacuum on the tractor vehicle. In the embodiment illustrated the trailer pump 2 is operated by vacuum from a reservoir 7 mounted on the chassis of the tractor, the pump being connected to the reservoir by a conduit 8. In cases where the tractor vehicle is equipped with fluid pressure or vacuum-operated brakes the tractor brake reservoir can conveniently be used as the source of power for operating the trailer lubricating pump. A lubricant reservoir 9 is also provided for the trailer pump which may conveniently be of the kind described in United States Patent No. 2,157,970, dated May 9, 1939. The pump described in said patent is arranged to deliver successively through a series of conduits measured quantities of lubricant and is actuated by a piston and cylinder device which is operated by fluid pressure or vacuum.

For the purpose of controlling the actuation of the trailer pump the present invention provides a valve device 10 (Figs. 2 and 3) which is interposed in the conduit 8 connecting the cylinder 11 of the trailer pump with the vacuum reservoir 7 on the tractor vehicle.

This valve device preferably comprises an elongated cylindrical valve casing 12 formed with first and second cylindrical valve chambers 13 and 14, one at each end thereof. Extending between the two chambers is a guide bore 15 in which is slidably guided the hollow stem 16 of a valve plunger 17 whose head 18 is slidably disposed in the first chamber 13. The latter is open to atmosphere through a port 19 in the wall thereof and the hollow valve stem is formed with transverse ports 20 which open into said first chamber so that the interior of the valve stem is in constant communication with atmosphere. The end 21 of the valve stem 16 remote from the head of the valve plunger is open and projects slightly into the second chamber 14, which, at its outer end, is formed with an inlet port 22 adapted to be connected by the conduit 8 with the vacuum reservoir 7. A portion of the guide bore 15 at the end thereof which opens into the chamber 14 is of enlarged diameter to form an annular space 23 around the open end 21 of the valve stem. This annular space is at all times in communication with the operating cylinder 11 of the trailer lubricating pump through a port 24 which opens into the annular space 23 and which is adapted to be connected by the conduit 8 with said operating cylinder. Surrounding the annular space at the end thereof which opens into the second chamber is an annular valve seat 25 adapted for engagement by the preferably rubber end-face 26 of a hollow cylindrical valve member 27 which is slidably disposed within the chamber 14 and which is coaxial with the hollow stem 16 of the valve plunger 17. The end of the valve member 27 remote from the end valve-face 26 is in open communication with the inlet port 22 in the chamber 14, and a portion of the valve member adjacent its valve-face is of reduced diameter to form an annular clearance 28 which communicates with the interior of the valve member through transverse ports 29 formed in the wall thereof. Thus the interior of the chamber 14 forwardly of the cylindrical valve member is in constant communication with the vacuum reservoir by way of the inlet port 22, the transverse ports 29 in the valve member 27, and the annular clearance 28. A coil spring 30 is arranged to urge the valve member 27 towards seating engagement with the annular valve seat 25.

The valve device 10 controls the operation of the trailer lubricating pump in the following manner:

When the valve plunger 17 is permitted to occupy the rearward position shown in Fig. 2, in which the open end 21 of its hollow stem 16 is located within the enlarged portion 23 of the guide bore 15, into which position the valve plunger is urged by a coil spring 31 housed within the chamber 13 and bearing against the head 18 of the valve plunger, the rubber end-face 26 of the cylindrical valve member 27 is seated against the annular valve seat 25 so that the operating cylinder 11 of the trailer pump 3 is cut off from the vacuum reservoir and is open to atmosphere via the enlarged portion 23 of the guide bore, the hollow stem 16 of the valve plunger, the transverse ports 20 in said stem and the atmospheric port 19 in the wall of the chamber 13. Under these conditions the trailer pump is inoperative.

When the valve plunger is advanced, however, as shown in Fig. 3, the open end 21 of its stem engages the rubber end-face 26 of the cylindrical valve member and is sealed thereby, thus cutting off the operating cylinder of the trailer pump from atmosphere. Continued movement of the valve plunger unseats the cylindrical valve member and places the said operating cylinder in communication with the vacuum reservoir via the port 24, the enlarged portion 23 of the guide bore 15, the annular clearance 28, the transverse ports 29 in the valve member 27, and the port 22, thereby causing actuation of the trailer pump.

It will readily be seen that in order to effect automatic and periodic actuation of the trailer pump it is necessary to impart periodic reciprocation to the valve plunger.

According to the present invention this is achieved by means of the mechanically operated tractor lubricating pump, a reciprocating component of which, or by means of a suitable cam mechanism, a rotating component of which, may be adapted to impart the necessary periodic reciprocation to the valve plunger. For example, the valve device described above can readily be used with a mechanically operated lubricating pump of the kind described in British Patent No. 570,783, especially a pump of this kind having provision for two distributor and pump units instead of only one as shown and described in the aforesaid British patent, since one of the units can then conveniently be replaced by the valve device without necessitating any substantial modification of the pump. This is clearly illustrated in Fig. 3 of the accompanying drawings which shows a lubricating pump of the general character described in the aforesaid British Patent No. 570,783, but initially adapted for two distributor and pump units. Only one of these units is employed, however, the other being replaced by the valve device 10.

The pump includes a casing 32 which is adapted to contain lubricant fed from a reservoir (not shown) and to one end of which is fitted the distributor and pump unit, indicated generally by the reference numeral 33. This unit basically comprises a reciprocating pump plunger 34 which is adapted to discharge, at each actuation, a measured quantity of lubricant through one of a series of passages 35 into a conduit 36 connected with the passage and leading to a point on the tractor chassis requiring lubrication. One of these conduits is provided for each of the passages 35 and leads to a separate point on the chassis. The lubricant is discharged through the passages in succession under the control of a rotory distributor 37 which is indexed round in step-by-step rotation by a pawl (not shown) and ratchet wheel 38, the latter being fixed to the distributor. The pawl is mounted on a carrier ring 39 which is oscillated angularly by an eccentric block 40 operating in a slot 41 in the pawl carrier and pivotally mounted at one end of a shaft 42 to which there is fixed a worm-wheel 43 driven by a worm 44. This worm is driven by the belt and pulleys 6 referred to earlier herein.

The pump plunger is reciprocated by a face-cam 45 which is secured to one side of the worm-wheel for rotation therewith, and between the rim of which and the head of the pump plunger a roller 46 is interposed, the roller being carried at one end of an idler arm 47 whose other end is pivotally secured to the wall of the pump casing. A portion of the idler arm adjacent the roller bears against the head of the pump plunger.

On the side of the worm-wheel 43 remote from the face-cam 45 there is fixed a second face-cam 48 which is substantially identical to the face-cam 45 and with which a roller 49 and idler arm 50 are similarly associated. This second face-cam, although provided initially for operating the pump plunger of the second distributor and pump unit, is conveniently employed in the present invention for imparting the required periodic reciprocation to the plunger of the valve device 10, the latter being supported by an end-plate 51 of the pump casing 32 in a position wherein its head 18 is engaged by the second idler arm 50.

It will be readily seen that by means of the two face-cams 45 and 48 the rotary motion of the worm-wheel is translated into a reciprocatory motion of the pump plunger 34 and the valve plunger 17, thereby causing automatic and periodic actuation of the tractor lubricating pump and the trailer lubricating pump respectively.

We claim:

1. A lubricating system for tractor-trailer vehicles comprising a mechanically operated lubricating pump mounted on the tractor, a fluid-pressure or vacuum operated lubricating pump mounted on the trailer, a source of fluid-pressure or vacuum for operating the trailer lubricating pump, and a valve device operable by the tractor lubricating pump for controlling the application of fluid-pressure to the trailer lubricating pump so as to effect automatic and periodic actuation therof.

2. A lubricating system according to claim 1 wherein said valve device is interposed in the fluid connection between said trailer lubricating pump and the source of fluid-pressure or vacuum, and includes a movable valve element operable by the tractor lubricating pump to place the trailer lubricating pump in communication with the source of fluid-pressure or vacuum and with atmosphere alternately so as to effect automatic and periodic actuation of said trailer pump.

3. A lubricating system according to claim 2 wherein said valve element is reciprocably mounted within a valve casing having a first port connected with the trailer pump, a second port connected with the source of fluid-pressure or vacuum, and an atmospheric port, and including a second movable valve element within said casing having spring means biassing it into a position to cut off the first port from the second port, the first valve element having spring means biassing it into a position to place the first port in communication with the atmospheric port, but being movable by the tractor pump firstly into engagement with the second valve element so as to cut off the first port from the atmospheric port and thereafter to unseat the second valve element so as to place the first port in communication with the second port, whereby periodic reciprocation of the first valve element by the tractor pump causes the first port to be placed in communication with the second port and the atmospheric port alternately.

4. A lubricating system according to claim 3 wherein said first valve element consists of a plunger having a head portion slidable in a first chamber in the valve casing, and having a hollow stem slidable in a guide bore which opens into a second chamber in the valve casing, in which second chamber the second valve element is disposed, and wherein the atmospheric port opens into said first chamber, the second port opens into said second chamber, and the first port opens into an enlarged portion of the guide bore, which enlarged portion opens into said second chamber and is surrounded by an annular valve seat onto which the second valve element is urged by a spring so as to cut off the first port from the second port.

5. A lubricating system according to claim 4 wherein the hollow stem of the first valve element is open at its end adjacent the second valve element and is formed near its other end with one or more transverse ports which open into said first chamber so as to place the interior of the stem in permanent communication with atmosphere, and wherein the first valve element is urged by a spring in a direction to move the open end of its hollow stem away from the second valve element so as to place the first port in communication with atmosphere, but is axially movable firstly to engage the second valve element with the open end of its stem so as to cut off the first port from atmosphere, and thereafter to unseat said second valve element so as to place the first port in communication with the second port.

6. A lubricating system according to claim 5 wherein said second valve element consists of a hollow cylindrical member which is axially slidable within said second chamber and which is closed at its end adjacent the first valve element so as to form a valve face whose outer portion is engageable with the annular valve seat and whose inner portion is engageable by the open end of the hollow stem of the first valve element, one or more ports being provided in the wall of said cylindrical member so as to place the end of the second chamber adjacent said valve seat in permanent communication with the second port via the interior of said cylindrical member.

7. A lubricating system for tractor-trailer vehicles, said system comprising a mechanically operated lubricating pump mounted on the tractor, a fluid-pressure or vacuum operated lubricating pump mounted on the trailer, a source of fluid-pressure or vacuum for operating the trailer lubricating pump, and a valve device attached to the tractor lubricating pump for controlling the application of fluid-pressure or vacuum to the trailer lubricating pump, the tractor lubricating pump including a rotary component, and cam means driven by said component for intermittently operating said valve device so as to effect automatic and periodic actuation of the trailer lubricating pump.

8. A lubricating system according to claim 7, wherein said rotary component consists of a continuously driven worm wheel, and said cam means comprises a face-cam secured to said worm wheel, said face-cam having engagement with a movable element of said valve device and being operable to convert the rotary motion of said worm wheel into a reciprocatory motion of said movable valve element.

References Cited in the file of this patent

UNITED STATES PATENTS

| | | |
|---|---|---|
| 1,621,975 | Erskine | Mar. 22, 1927 |
| 1,987,256 | Johnson | Jan. 8, 1935 |
| 2,675,097 | Dorsey | Apr. 13, 1954 |

FOREIGN PATENTS

| | | |
|---|---|---|
| 626,093 | Great Britain | July 8, 1949 |